(12) United States Patent  
Thomsen

(10) Patent No.: US 9,011,054 B2  
(45) Date of Patent: Apr. 21, 2015

(54) TRANSPORT SYSTEM FOR A WIND TURBINE BLADE

(71) Applicant: Jens Thomsen, Brande (DK)

(72) Inventor: Jens Thomsen, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/017,772

(22) Filed: Sep. 4, 2013

(65) Prior Publication Data

US 2014/0064870 A1    Mar. 6, 2014

(30) Foreign Application Priority Data

Sep. 6, 2012    (EP) .................................. 12183310

(51) Int. Cl.
*B60P 7/08* (2006.01)
*B60P 3/40* (2006.01)
*F03D 1/00* (2006.01)

(52) U.S. Cl.
CPC . *B60P 3/40* (2013.01); *F03D 1/005* (2013.01); *Y02E 10/72* (2013.01)

(58) Field of Classification Search
USPC ............... 410/32, 34, 35, 44, 45, 53, 96, 120, 410/155; 280/404
See application file for complete search history.

(56) References Cited

U.S. PATENT DOCUMENTS

| 7,591,621 | B1 | 9/2009 | Christopher |
| 7,690,875 | B2 * | 4/2010 | Grabau .......................... 410/45 |
| 2011/0142589 | A1 | 6/2011 | Ten Thoren |
| 2012/0114443 | A1 | 5/2012 | Cyrus et al. |

FOREIGN PATENT DOCUMENTS

| EP | 1659026 A1 | 5/2006 |
| WO | WO 03057528 A1 | 7/2003 |
| WO | WO 2005005286 A1 | 1/2005 |
| WO | WO 2006000230 A1 | 1/2006 |

\* cited by examiner

*Primary Examiner* — Stephen Gordon

(57) ABSTRACT

A transport system for a wind turbine blade is provided. The transport system is configured for increasing a curvature of the wind turbine blade in response to an obstacle during transport of the wind turbine blade. Further, a method for transporting a wind turbine blade in order to avoid obstacles is provided.

11 Claims, 6 Drawing Sheets

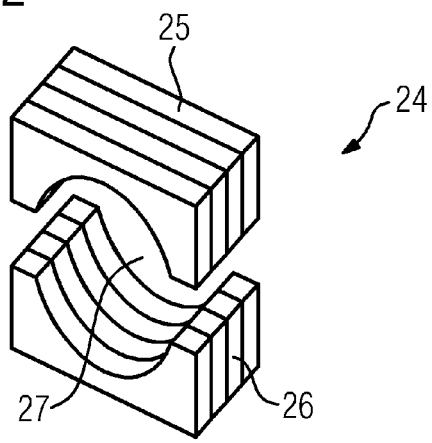
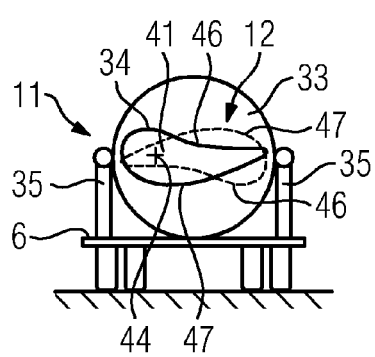
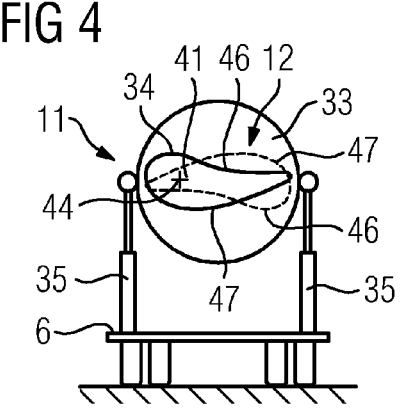

TRANSPORT SYSTEM FOR A WIND TURBINE BLADE

CROSS REFERENCE TO RELATED APPLICATIONS

The present application claims priority to European Patent Office application No. 12183310.7 EP filed Sep. 6, 2012, the entire content of which is hereby incorporated herein by reference.

FIELD OF INVENTION

The present invention relates to a transport system for a wind turbine blade and a method for transporting a wind turbine blade.

BACKGROUND OF INVENTION

Nowadays, wind turbine blades have lengths exceeding 40 meters and maximum widths exceeding 5 meters. Transport of these large and especially very long objects along curved roads and roundabouts is difficult, in particular in the presence of trees and buildings on the side of the road. Further difficulties are experienced when such blades need to be transported underneath bridges crossing the road. Measures thus need to be taken to prevent collision of the blade with various obstacles.

WO 2005/005286 describes a wind turbine blade which is prestressed by means of prestressing means at a distance from the blade root in such a manner that the blade tip is brought closer to the longitudinal central axis of the blade root.

EP 1659026 A1 describes a transport device having pivoting means to pivot a wind turbine blade into an oblique orientation relative to the horizontal.

WO 03/057528 A1 discloses a transport vehicle having fixing and/or receiving devices configured in such a way that they permit the rotation of the wind turbine blade about its longitudinal axis in order to pass underneath bridges.

SUMMARY OF INVENTION

It is one objective of the present invention to provide an approach for a simple and thus low-cost transport system for a wind turbine blade.

Accordingly, a transport system for a wind turbine blade is provided. The transport system is configured for increasing a curvature of the blade in response to an obstacle during transport of the blade.

By increasing the curvature of the blade, the dimensions of the blade in one direction can be reduced. For example, when the blade is transported along a curved road, the blade is bent so that its curvature corresponds to the curvature of the road. Thus, the blade will not, or to a lesser extent, extend beyond the road, thereby simplifying transport. Also, when the blade needs to be transported underneath a bridge, the blade may be bent downwards to prevent collision of the blade with the bridge. According to a further aspect, the blade may be bent upwards to prevent the blade from touching on the road due to excitations resulting from transport.

The blade may be configured as a straight or curved blade. Curved blades are designed so as to curve away from the wind turbine tower when mounted. Curved blades have, in their unloaded state, a substantially concave side and an opposite substantially convex side. Curved blades may have a curvature of 2 or more meters.

The blade may be manufactured from a fiber-reinforced polymer.

"Increasing a curvature of the blade" presently refers to increasing the curvature of the blade starting out from an unloaded or loaded state of the blade.

"Obstacle" herein refers to, for example, bridges, trees, buildings and other structures. In particular, these obstacles are arranged next to a curved road or a roundabout.

"In response to an obstacle" means that the transport system may be configured to increase the curvature of the blade semi-automatically, i.e. some human interaction is still required, but at least some steps in increasing the curvature of the blade are performed by the transport system as such. Or, alternatively, the transport system may be configured to automatically, i.e. without human interaction, increase the curvature of the blade.

According to an embodiment, a pulling device is provided, the pulling device being configured to increase the curvature of the blade by pulling at one end of the blade. The one end may be configured as the tip of the blade. Such a pulling device is simple to manufacture and control.

According to a further embodiment, the pulling device is configured to pull the one end upwards and/or sideways. "Upwards" refers to a direction perpendicular to the horizontal. "Sideways" refers to a direction in the plane of the horizontal and, preferably, perpendicular to the plane of the blade. By pulling the one end upwards, the length of the blade along the road is substantially reduced. By pulling the one end sideways, the blade is bent to, for example, follow the curvature of the road.

According to a further embodiment, the pulling device comprises a cable for attaching to the blade at its one end and a winch for winding up the cable in order to increase the curvature of the blade. For example, the root of the blade may be supported on a trailer, and the tip of the blade may extend past the trailer. The winch may be arranged on the trailer and may be configured to pull the tip of the blade upwards, thereby bending the blade upwards. This will prevent touching of the tip of the blade on the ground or road during transport. In addition or instead of the winch at least one hydraulic cylinder may be used for shortening the cable in order to increase the curvature of the blade.

According to a further embodiment, a first support device is provided, the first support device being configured for supporting the blade at its other end. The first support device may be arranged on a trailer. The first support device may support the root of the blade.

According to a further embodiment, the first support device is configured for turning the blade around its longitudinal axis. Typically, a blade has one preferred direction of bending. In the case of a curved blade having a convex and a concave side in its unloaded state, bending preferably takes place in a direction such that the concave side of the blade is arranged on the inside of the arc described by the bent blade. Thus, by way of this embodiment, the blade is turned about its longitudinal axis, when it is desired to bend the blade sideways and the concave side of the blade is not arranged on the desired side. According to an alternative embodiment, the blade is not turned at all: When bending the blade in the first direction, the concave side of the blade is arranged on the inside of the arc described by the bent blade, and when bending in the second direction (opposite the first direction), the (initially) concave side of the blade is arranged on the outside of the arc described by the bent blade.

According to a further embodiment, the pulling device is configured to pull the one end upwards, when a cross-section of the blade is arranged horizontally, and/or the pulling device is configured to pull the one end sideways, when a cross-section of the blade is arranged vertically. Thus, the forces required for bending and thus pulling are kept at a minimum.

"A cross-section of the blade is arranged horizontally" means that the plane in which the cross-section substantially extends is parallel to the horizontal. Yet, deviations of 0 to 20 degrees from the horizontal are encompassed herein. By the same token, "a cross-section of the blade is arranged vertically" means that the plane, in which the cross-section of the blade substantially extends, is parallel to the vertical. Deviations from the vertical between 0 and 20 degrees are encompassed herein.

According to a further embodiment, the first support device is configured for turning the blade about its longitudinal axis for a side of the blade having a concave shape in an unloaded state of the blade to be arranged on the same side of the blade which is provided with the increase in curvature. Thus, the blade is always bent in its preferred direction of bending.

According to a further embodiment, the first support device is configured for lifting the blade to allow for the turning of the blade around the longitudinal axis. Generally speaking, the longitudinal axis of the blade (corresponding to the turning/yawing axis of the blade when mounted on a tower) has an offset with respect to the perimeter of the blade. Thus, the blade needs to be lifted vertically relative to the trailer when a turn of at least 180 degrees is to be performed.

According to a further embodiment, a second support device is provided, the second support device being configured for supporting the blade at a position in between its two opposite ends. This reduces loads on the blade. Also, in combination with the first support device, two support points of the blade on, for example, a trailer supporting the blade may be obtained.

According to a further embodiment, the second support device is configured for lifting and/or lowering the blade at the position, thereby lifting and/or lowering the blade at its one end. Thereby, the top of the blade may be moved, in addition to the bending of the blade, further away from the road and lowered to pass underneath a bridge, for example.

According to a further embodiment, the second support device comprises a disk with an opening for the blade to extend therethrough and a cradle in which the disk is rotatably supported. This allows for easy and cost-effective rotation of the blade about its turning (support) axis. The disk may be manufactured from a polystyrene material.

According to a further embodiment, a trailer is provided having the pulling device, the first support device and/or the second support device.

According to a preferred embodiment, a standard trailer configured for transporting containers is used and equipped with the pulling device, the first support device and/or the second support device. Thus, a cost-effective solution is obtained.

According to a further embodiment, a truck for pulling the trailer is provided, the trailer being configured to support the blade only over part of its length. For example, the blade may stick out over the back of the trailer by at least a quarter, a third, a half, two thirds or three quarters of its total length.

According to a further embodiment, a method for transporting a wind turbine blade is provided. According to the method, a curvature of the blade is increased in response to an obstacle during transport of the blade.

BRIEF DESCRIPTION OF THE DRAWINGS

Further objects, features and advantages of the present invention will become apparent from the subsequent description and depending claims, taking in conjunction with the accompanying drawings, in which:

FIG. 2 is a perspective view of a cover used in FIG. 1;

FIG. 3 is a section III-III from FIG. 1;

FIG. 4 shows the embodiment of FIG. 3, yet in a vertically lifted state;

DETAILED DESCRIPTION OF INVENTION

Figure 1:
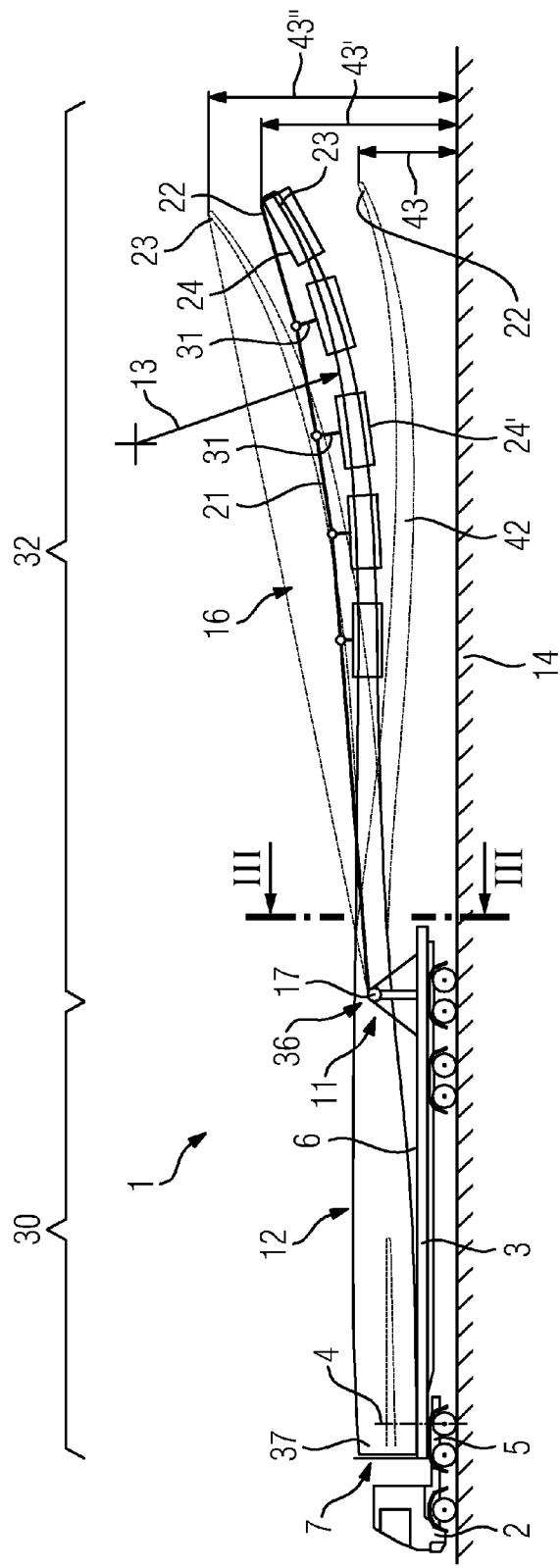
FIG. 1 is a side view of a transport system according to one embodiment.

In the Figures, like reference numerals designate like or functionally equivalent elements, unless otherwise indicated.

FIG. 1 shows in a side view a transport system 1 according to an embodiment of the present invention.

The transport system 1 comprises a truck 2 and a trailer 3. The trailer 3 may be rotatably connected to the truck 2 by a hinged console 5. An axis of rotation is designated at 4. Thereby rotation of the trailer 3 relative to the truck 2 in the horizontal plane is allowed. Further, the trailer 3 may be detachably connected to the truck 2 by the hinged console 5.

The trailer 3 comprises a loading surface 6. A first and a second support device 7, 11 are arranged on the loading surface 6. The first and second support device 7, 11 may be connected by standard means to the loading surface 6. Thus, a standard truck 2 and trailer 3 may be used as the basis for the transport system 1 of the present invention.

The transport system 1 is configured for transporting a wind turbine blade 12. Further, the transport system 1 is configured for increasing a curvature 13 of the blade 12 in response to an obstacle. The road 14 on which the transport system 1 is travelling (as will be explained in more detail later) or a tree 15 (see FIG. 8) may form such obstacles. To this end, a pulling device 16 is mounted on the loading surface 6 of the trailer 3. The pulling device 16 has a winch 17 and a cable 21. The cable 21 is wound up or released by the winch 17 at its one end and attaches at its other end 22 to the tip 23 of the blade 12. Instead of the winch 17 a hydraulic cylinder may be used. The hydraulic cylinder (designated by the same reference numeral 17 in FIG. 1) may comprise a piston having a free end. The one end of the cable 21 may attach to the free end. In one configuration, the cable 21 is effectively shortened by retracting the piston.

The transport system 1 may comprise a number of covers 24 (which may also be referred to as bushings), in particular made of polystyrene. The covers 24 protect the blade 12 when collisions of the blade 12 and an obstacle cannot be prevented. More important, one or more of the covers 24 connect the blade 12 to the cable 21, which may be configured as a steel cable. The covers 24 allow for the connection of the cable 22 to the blade 12 without reducing the structural integrity of the blade 12. The covers 24 may be configured as shown in FIG. 2.

FIG. 2 shows a cover 24 comprising two halves 25, 26 adapted to form an opening 27 for the blade 12 to reach therethrough. The covers 25, 26 may be held together by straps or other fastening means (not shown). The end 22 of the cable 21 may be attached to, for example, the half 25 of the cover 24. Thus, forces radial to the blade 12 may be easily transmitted to the blade 12 by the cable 21. In addition, one or more other covers 24' may be each connected to the cable 21 by a support cable 31, thus providing additional support to the blade 12. The free section 32 of the blade 12, i.e. the section of the blade 12 including the tip 23 that is not supported, may extend past the second support device 11 and the rear end of the trailer 6 by, for example, more than half of the total length of the blade 12. Reference numeral 30 indicates the fixed section of the blade 12 between the first and second support device 7, 11, which is shorter than the free section 32, and may be as small as, for example, 15 meters at a total length of the blade 12 of 50 meters.

FIG. 3 shows a section III-III from FIG. 1.

The second support device 11 has, for example, a disk 33 comprising an opening 34 through which the blade 12 extends. The disk 33 is rotatably supported as will be explained in more detail in connection with FIG. 12. Also, the second support device 11 comprises at least one hydraulic cylinder 35 or other lifting means for vertically lifting (and lowering) the disk 33, and thereby lifting (or lowering) the blade 12 at a position 36 (see FIG. 1) in between the tip 23 and a root 37 of the blade 12.

As can be seen from FIG. 3, the cross-section 41 of the blade 12 is orientated horizontally. In other words, the long side of the cross-section 41 extends substantially parallel to the horizontal. The blade 12 may be provided with a concave side 46 and a convex side 47 (also see FIG. 4). In other words, the blade 12 may have a natural curvature defining an arc in its unloaded state (bending upwards in the case of FIG. 1). When mounted on a wind turbine tower, the concave side 46 faces away from the wind turbine tower. In the horizontal position of the cross-section 41 shown in FIG. 3, the concave side 46 may—generally speaking—face either upwards (shown in solid lines) or downwards (shown in broken lines). Presently however, the concave side 46 faces upwards so that the blade 12 bends upwards in its unloaded state as shown in FIG. 1. Reference numeral 42 indicates the unloaded position of the blade 12 in FIG. 1. In this state, the tip 22 of the blade has a first distance 43 from the road 14. When the winch 17 is wound up (or the piston of the hydraulic cylinder is retracted), the curvature 13 of the blade 12 increases due to the force applied to the blade 12 through the cable 21 and the support cables 31. Thus, the end 23 moves up vertically. The distance 43' is thus larger than the distance 43. If now, in addition, the hydraulic cylinders 35 are extended as indicated in FIG. 4, the tip 23 of the blade 12 moves up even further. Thus, the distance 43" is even larger than the distance 43'.

The distances 43' and 43" will prevent collision of the blade tip 23 and the road 14 as a result of excitations resulting from transport.

In an alternative embodiment, the concave side 46 faces downwards (see broken lines in FIG. 3) and the blade 12 thus curves downwards in FIG. 1 (not shown), the curvature 13 of the blade first decreases and then increases again, when the force is applied to the blade 12 via the cable 21 bending the blade 12 upwards (away from the road 14 in FIG. 1).

Figure 5:
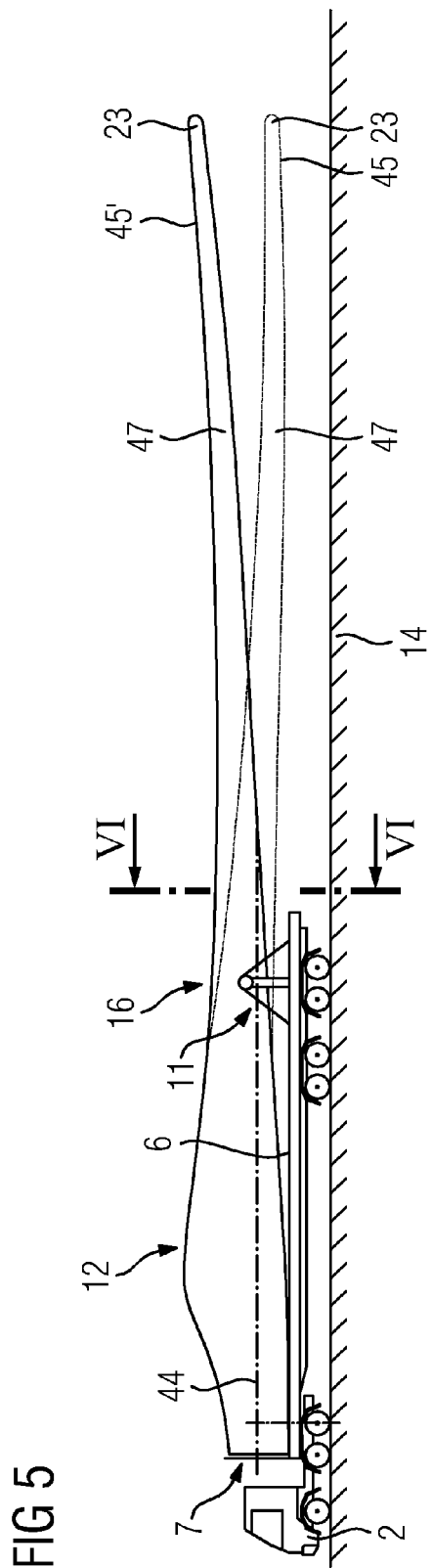
FIG. 5 shows the transport system of FIG. 1, wherein a wind turbine blade has been turned by 90 degrees in the counter-clockwise direction.

FIG. 5 shows the transport system 1 of FIG. 1, yet the blade 12 has been turned by 90 degrees around its longitudinal axis 44 in the counter-clockwise direction. Typically, the longitudinal axis 44 runs through the center of the cross-section 41 (see FIG. 6) of the blade 12.

Figure 6:
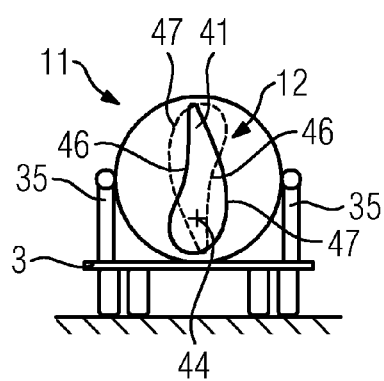
FIG. 6 shows a section VI-VI from FIG. 5.

FIG. 6 shows a cross-section VI-VI from FIG. 5.

The cross-section 41 of the blade 12 is orientated vertically. In other words, the cross-section 41 has a long side extending substantially vertically. This turning about the longitudinal axis 44 is, for example, carried out by the first support device 7 as will be explained in more detail in connection with FIG. 11.

Now returning to FIG. 5, the unloaded state of the blade 12 is shown in dashed lines and is indicated at 45. In FIG. 5, the blade 12 curves into the plane of the paper.

Figure 7:
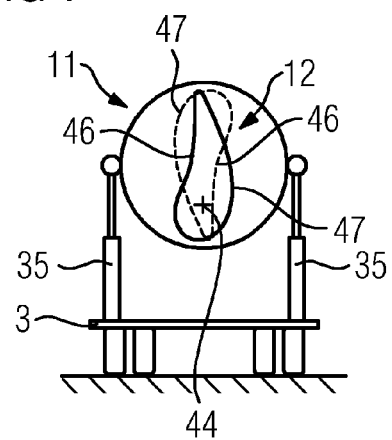
FIG. 7 shows the embodiment of FIG. 6, yet in a vertically lifted state.
Figure 8:
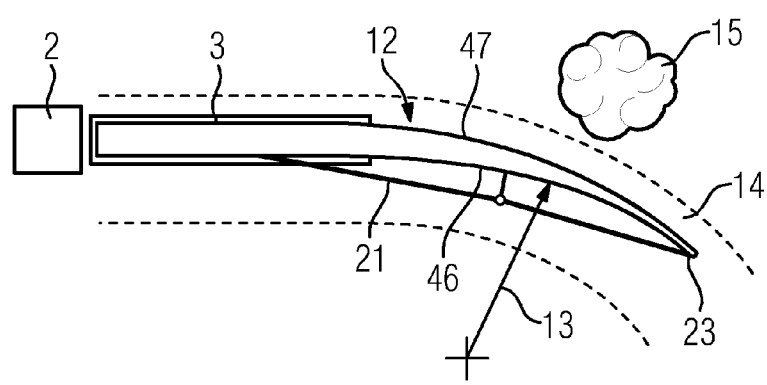
FIG. 8 shows a top view from FIG. 5.

FIG. 8 illustrates a top view from FIG. 5. The cable 21 applies a sideways pull to the tip 23 of the blade 12. Thus, the curvature 13 of the blade 12 is increased on top of the natural curvature of the blade 12. In other words, the pulling force is applied on the concave side 46 of the blade 12, which is the inner side of the arc defined by the blade 12. The corresponding sideways orientation of the concave side 46 of the blade 12 is shown in solid lines in FIGS. 6 and 7. In this manner, the blade 12 may be bent so as to have a curvature corresponding to the curvature of the road 14 as seen in FIG. 8. Thereby, a collision of the blade 12 and a tree 15 standing beside the road 14 may be easily prevented.

In addition, the end 23 of the blade 12 may be lifted by the hydraulic cylinders 35 (see FIG. 7). The corresponding position of the blade 12 is indicated at 45' in FIG. 5. In addition to avoiding a collision with the tree 15, touching of the blade tip 23 and the road 14 is safely prevented.

Figure 9:
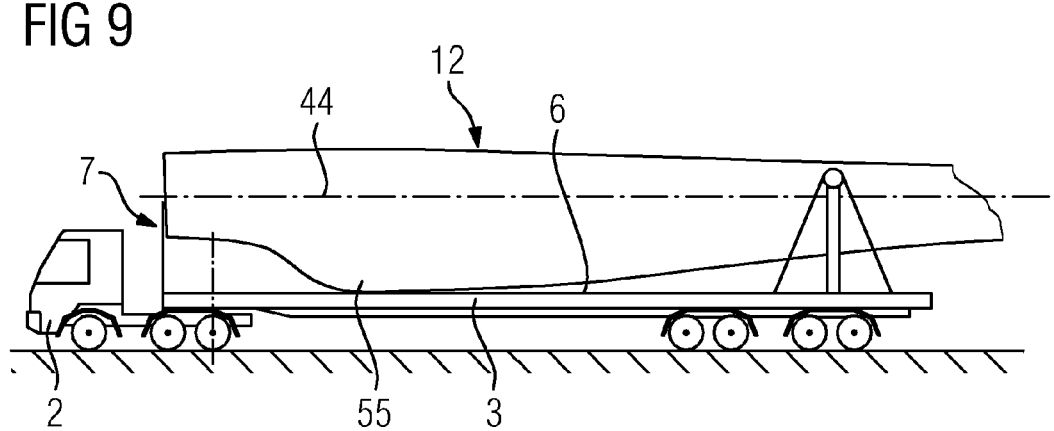
FIG. 9 shows a partial view from FIG. 1, yet with the blade having been turned by 90 degrees in the clockwise direction.

FIG. 9 shows the transport system of FIG. 1, yet the blade 12 has been turned by 90 degrees in the clockwise direction around the longitudinal axis 44 (see the cross-section 41 shown in broken lines in FIGS. 6 and 7). Since the cross-section 41 of the blade 12 is unsymmetrical about the longitudinal axis 44, the blade 12 needs to be lifted upwards by the first and second support device 7, 11 for turning. The corresponding extended position of the hydraulic cylinders 35 is shown in FIG. 7.

Figure 10:
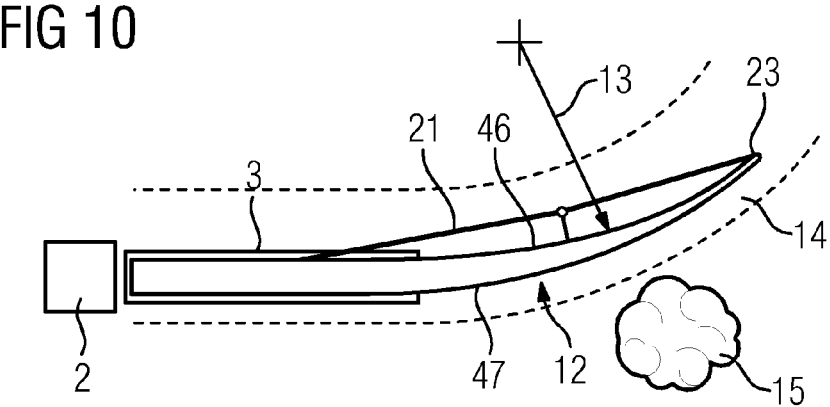
FIG. 10 shows the embodiment of FIG. 8, yet with the blade having been bent in the other direction.

FIG. 10 illustrates a top view from FIG. 9. The blade 12 has been bent also sideways like in FIG. 8, yet in the opposite direction. Again, the concave side 46 of the blade 12 is arranged on the inside of the arc defined by the blade 12. The curvature 13 of the blade 12 may follow the curvature of a road 14.

In an alternative embodiment, the concave side 46 of the blade 12 (in its unloaded state) is initially arranged on the outside of the arc defined by the blade 12 when bending. Thus, the curvature 13 of the blade 12 first decreases and then increases again in the process of bending. In this manner, the blade 12 does not need to be turned about its longitudinal axis 44 at all—irrespective of, e.g., the road 14 turning left or right—, making the transport system 1 more simple.

In particular, what has been said about the covers 24, 24' and the support cables 31 equally applies to the embodiments of FIGS. 5 to 10.

Figure 11:
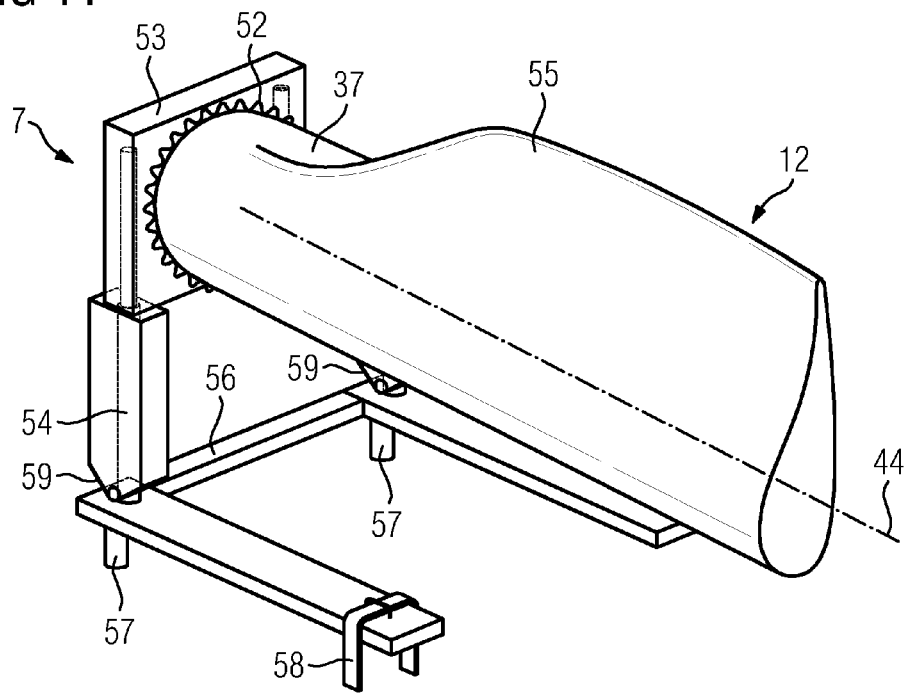
FIG. 11 in a perspective, partial view a first support device and the root of the blade from FIG. 1.

FIG. 11 illustrates in more detail the first support device 7 and the root 37 of the blade 12 connected thereto.

The root 37 is connected to a gear 52, which is driven by a corresponding gear (not shown). The corresponding gear is driven by an electric motor (not shown). The turning axis of the gear 52 coincides with the longitudinal axis 44 of the blade 12. In this manner, the blade 12 may be easily turned about the longitudinal axis 44. The gear 52 is mounted rotatably on a support element 53. The support element 53 is connected to hydraulic cylinders 54 mounted on either side of the support element 53. By supplying hydraulic pressure to the hydraulic cylinders 54, the support element 53 and thus the root 37 of the blade 51 may be moved upwards and downwards in order to allow for a full rotation (i.e. 360 degrees) even of the maximum width section 55 (indicated in FIGS. 9 and 11) of the blade 12. The hydraulic cylinders 54 are connected to a base element 56, which may have a U-shape, via hinges 59. The hinges 59 allow tilting of the blade 12 in response to the lifting of the blade 12 by the second support device 11. The base element 56 is connected by standard connectors 57 to standard container locks in the loading surface 6 of the trailer 3. Opposite the connectors 57, the base element 56 may be connected by straps 58 to the loading surface 6. The first support device 7 is thus detachably mounted to the loading surface 6.

Instead of the hydraulic cylinders 54, another lifting device may be employed, for example a scissor lift or a toothed bar in connection with a gear.

Figure 12:
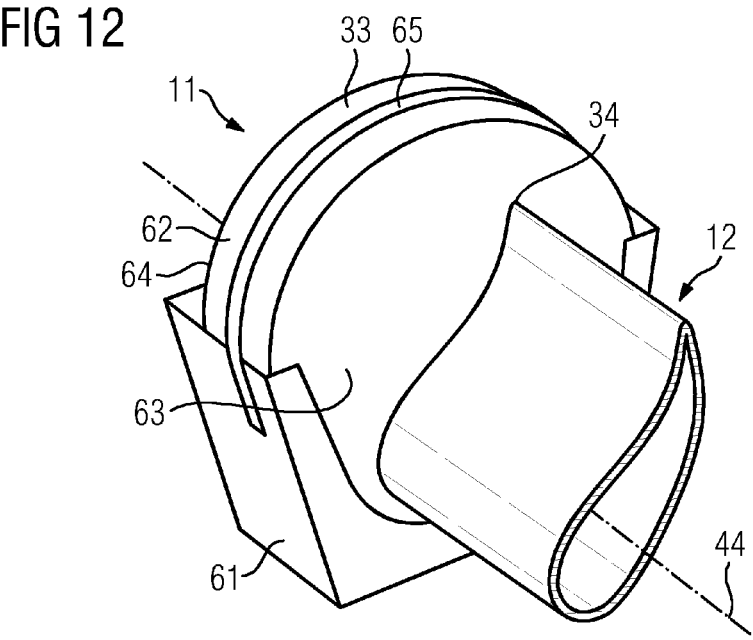
FIG. 12 in a perspective, partial view a second support device from FIG. 1.

FIG. 12 illustrates in a perspective view the second support device 11 as well as part of the blade 12.

The second support device 11 has a cradle 61 rotatably supporting the disk 33 on its outside perimeter 62 and axial faces 63, 64. The perimeter 62 is in sliding contact with the cradle 61 and thereby allows the turning of the blade 12 inside the cradle 61 due to the moment applied by the first support device 7. The disk 33 may be secured inside the cradle 61 by a strap 65. In particular, when the disk 33 is made from polystyrene, low-cost solutions may be obtained. The disk 33 may also comprise a combination of a polystyrene core and an outer part made of nylon or a similar material with low friction, thus allowing easy turning inside the cradle 61.

The hydraulic cylinders 35 of the second support device 11 (see FIG. 3) are not shown in FIG. 12 for ease of representation. Also, the second support device 11 may be connected detachably to the loading surface 6.

According to a further embodiment, the first support device 7 may lift the root 37 (see FIG. 1) for a given position of the blade tip 23, thereby increasing the tension inside the blade 12, which will prevent the tip 23 from touching the road 14 during transport even more.

Although the present invention has been described in accordance with preferred embodiments, it is obvious for a person skilled in the art that modifications are possible in all embodiments.

While said embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A transport system for a wind turbine blade comprising:
a pulling device configured for increasing a curvature of the wind turbine blade by pulling at a tip of the wind turbine blade; and
a first support device configured for supporting the wind turbine blade at a root of the blade, wherein the first support device is configured for turning the wind turbine blade around a longitudinal axis thereof.

2. The transport system of claim 1,
wherein the pulling device is configured to pull the tip upwards and/or sideways.

3. The transport system of claim 1,
wherein the pulling device comprises:
a cable for attaching to the wind turbine blade at the tip of the blade, and
a winch for winding up the cable, and/or
a hydraulic cylinder for shortening the cable in order to increase the curvature of the wind turbine blade.

4. The transport system of claim 1,
wherein the pulling device is configured to pull the tip of the blade upwards when a cross-section of the wind turbine blade is arranged horizontally, and
wherein the pulling device is configured to pull the tip of the blade sideways when a cross-section of the wind turbine blade is arranged vertically.

5. The transport system of claim 1,
wherein the pulling device is configured to pull a tip of the blade upwards when a cross-section of the wind turbine blade is arranged horizontally, or
wherein the pulling device is configured to pull a tip of the blade sideways when a cross-section of the wind turbine blade is arranged vertically.

6. The transport system of claim 1,
wherein the first support device is further configured for lifting and/or lowering the wind turbine blade to allow for the turning of the wind turbine blade around the longitudinal axis.

7. The transport system of claim 1, further comprising a second support device, wherein the second support device is configured for supporting the wind turbine blade at a position in between the first support device and the tip of the blade.

8. The transport system of claim 7,
wherein the second support device is configured for lifting and/or lowering the wind turbine blade at the position.

9. The transport system of claim 7,
wherein the second support device comprises:
a disk with an opening for the wind turbine blade to extend therethrough, and
a cradle in which the disk is rotatably supported.

10. The transport system of claim 7, comprising:
a trailer comprising the pulling device, the first support device and/or the second support device.

11. The transport system of claim 10, comprising:
a truck for pulling the trailer,
wherein the trailer is configured to support the wind turbine blade over a portion of a length of the wind turbine blade.

* * * * *